(12) United States Patent
Puranen

(10) Patent No.: US 7,447,528 B2
(45) Date of Patent: Nov. 4, 2008

(54) MULTIFUNCTION ELECTRONIC DEVICE

(75) Inventor: Jari Puranen, Tampere (FI)

(73) Assignee: Nokia Corporation, Espoo (FI)

( * ) Notice: Subject to any disclaimer, the term of this patent is extended or adjusted under 35 U.S.C. 154(b) by 463 days.

(21) Appl. No.: 11/104,762

(22) Filed: Apr. 12, 2005

(65) Prior Publication Data

US 2006/0229115 A1 Oct. 12, 2006

(51) Int. Cl.
*H04B 1/38* (2006.01)
*H04M 1/00* (2006.01)
*H04B 1/08* (2006.01)

(52) U.S. Cl. ............... 455/575.1; 455/90.3; 455/575.4

(58) Field of Classification Search ............ 455/566, 455/90.3, 575.1, 575.3, 575.8, 347–349
See application file for complete search history.

(56) References Cited

U.S. PATENT DOCUMENTS

| | | | |
|---|---|---|---|
| 5,657,370 A | 8/1997 | Tsugane et al. | |
| 6,099,338 A * | 8/2000 | Huang | 439/350 |
| 6,542,721 B2 * | 4/2003 | Boesen | 455/553.1 |
| 6,782,242 B1 * | 8/2004 | Koleda et al. | 455/90.3 |
| 6,836,404 B2 * | 12/2004 | Duarte | 361/680 |
| 6,941,618 B2 * | 9/2005 | Kim | 16/337 |
| 6,973,186 B2 * | 12/2005 | Shin | 379/433.12 |
| 7,107,084 B2 * | 9/2006 | Duarte et al. | 455/575.3 |
| 7,158,818 B2 * | 1/2007 | Lee | 455/575.4 |
| 2004/0192422 A1 * | 9/2004 | Watanabe et al. | 455/575.3 |
| 2004/0198307 A1 | 10/2004 | Chang | |
| 2004/0219956 A1 * | 11/2004 | Iwai et al. | 455/575.3 |
| 2005/0107137 A1 * | 5/2005 | Byun et al. | 455/575.1 |
| 2005/0124394 A1 * | 6/2005 | Kim et al. | 455/575.3 |
| 2005/0227737 A1 * | 10/2005 | Moon et al. | 455/566 |
| 2005/0255897 A1 * | 11/2005 | Lee et al. | 455/575.4 |

FOREIGN PATENT DOCUMENTS

| | | |
|---|---|---|
| EP | 0944219 | 9/1999 |
| EP | 1473842 | 11/2004 |
| JP | 9284368 | 10/1997 |
| JP | 11027353 | 1/1999 |
| JP | 2006005564 | 1/2006 |

* cited by examiner

*Primary Examiner*—Simon D Nguyen
(74) *Attorney, Agent, or Firm*—Alfred A. Fressola; Ware, Fressola, Van Der Sluys & Adolphson LLP

(57) ABSTRACT

The invention relates to a sliding and clamshell mechanism for an electronic device which comprises a first part comprising a first side, and a second side opposite to the first side, and further comprises a movable second part attached to the first part by a hinge, where the hinge is adapted to slide in an essentially longitudinal direction of the first part of the electronic device when the second part is turned with relation to the first part of the electronic device so that the longitudinal axis of the first part and the second part of the electronic device are essentially parallel to each other and where the second part is adapted to move from the second side of the first part of the electronic device toward the first side of the first part of the electronic device around the hinge by a rotation movement.

12 Claims, 6 Drawing Sheets

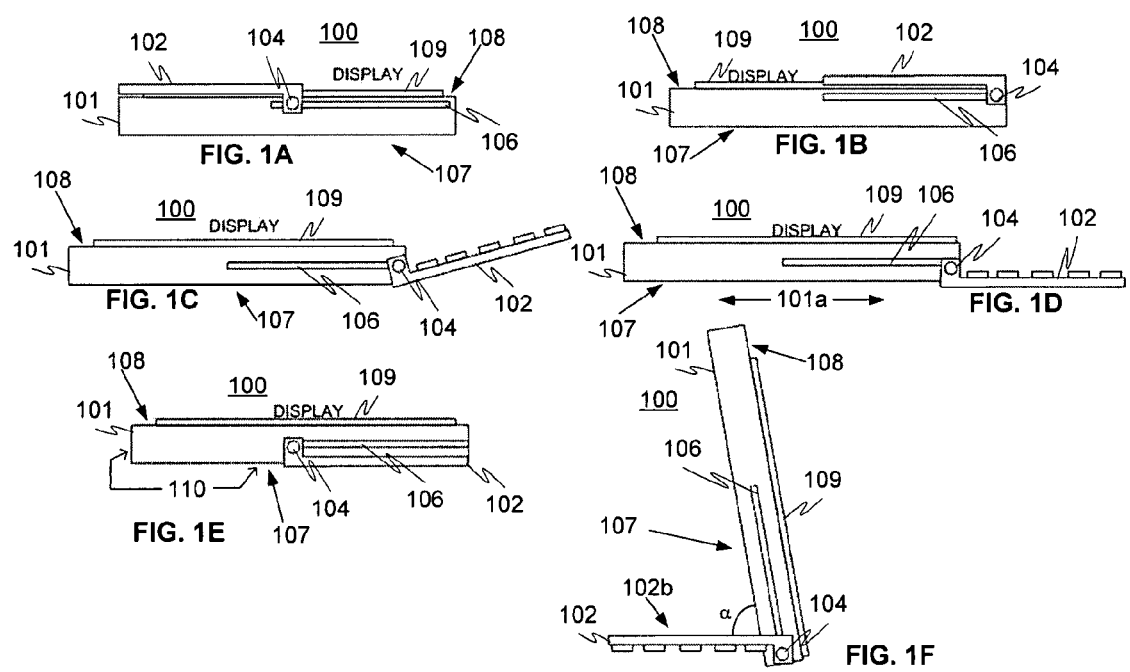

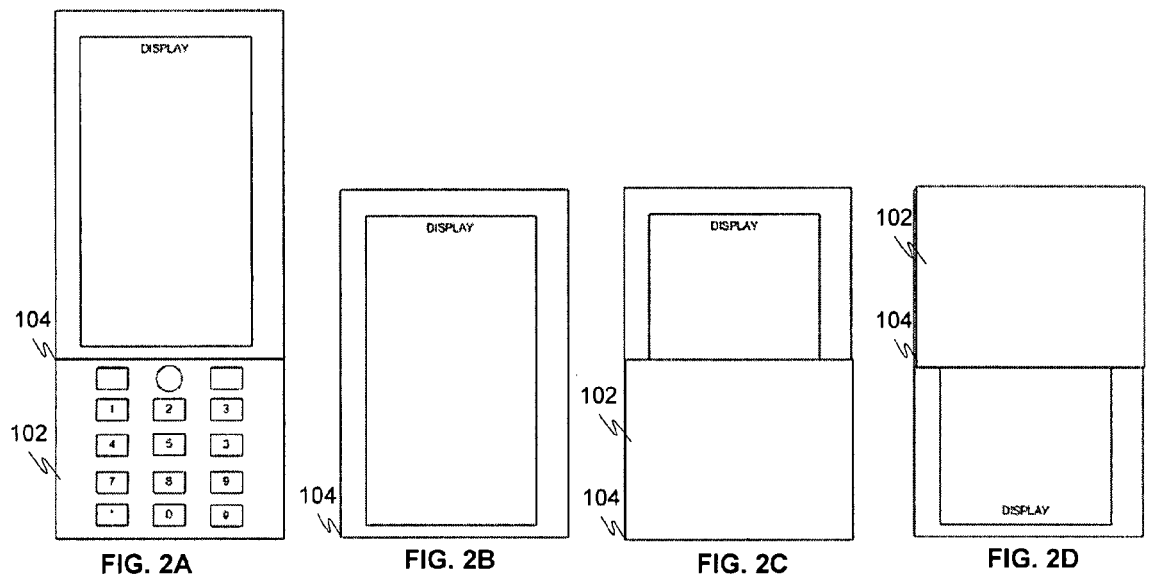

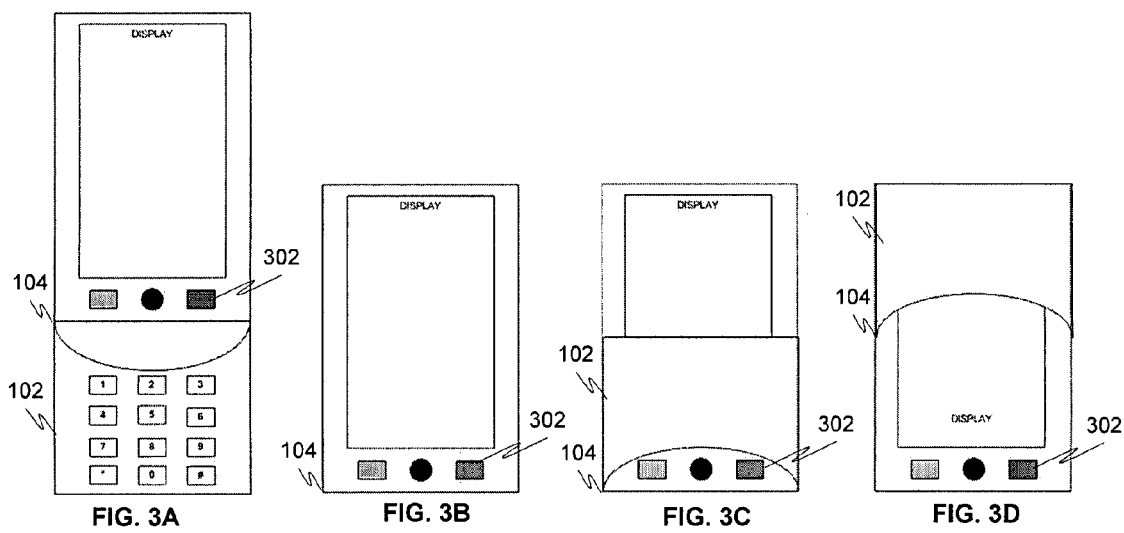

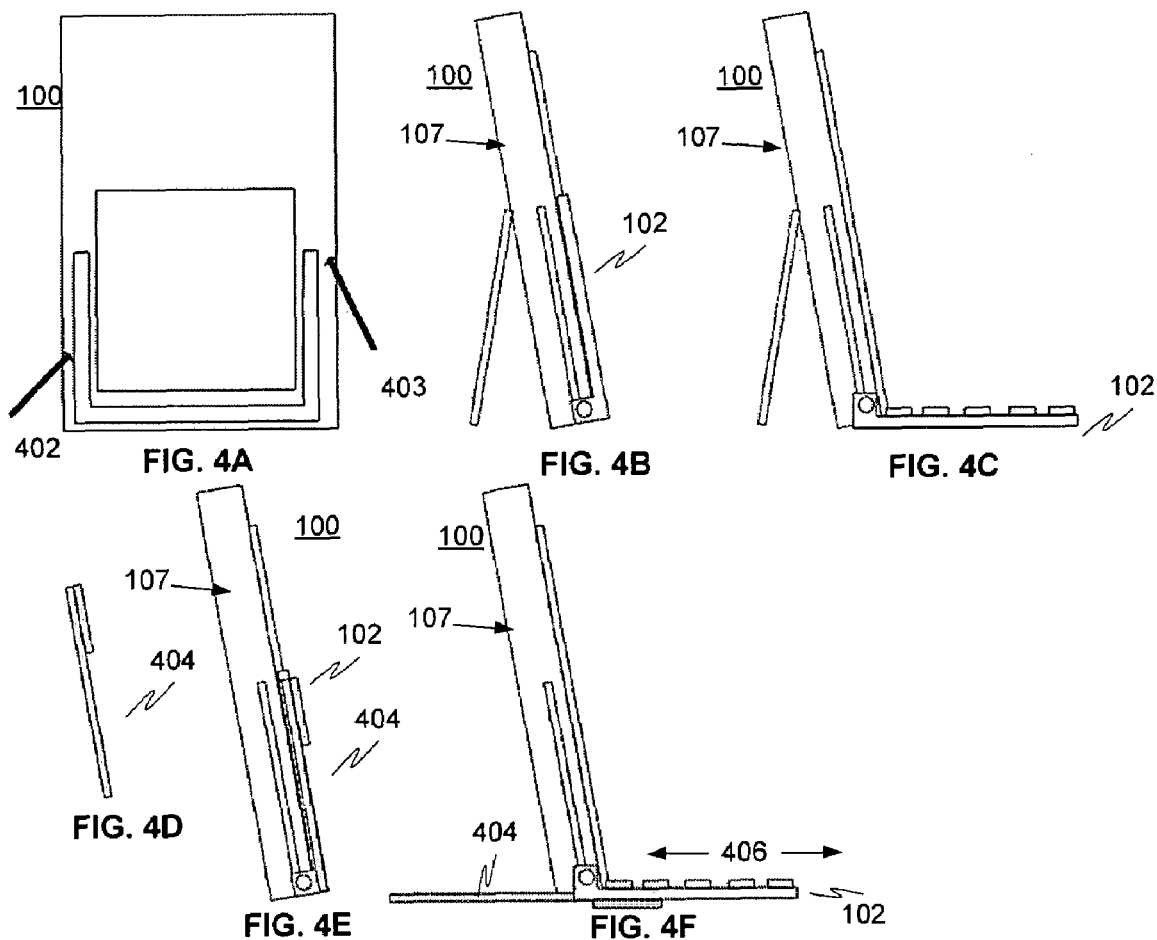

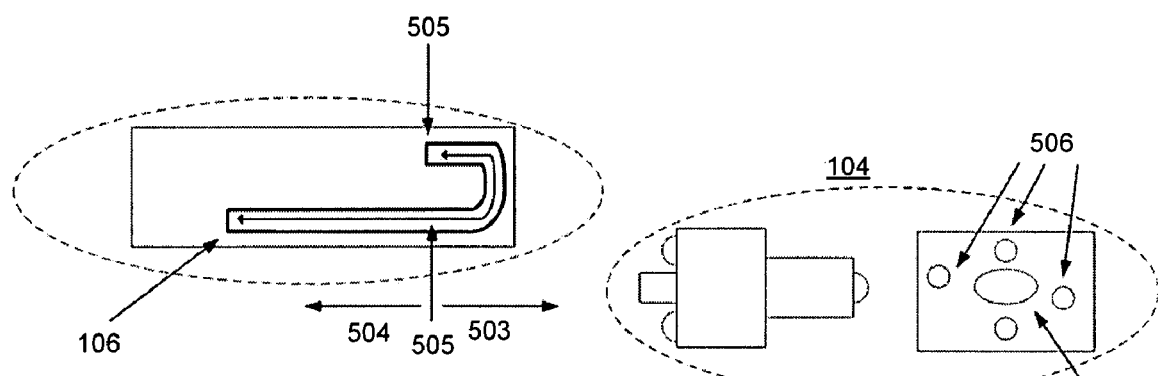
FIG. 5A
FIG. 5B
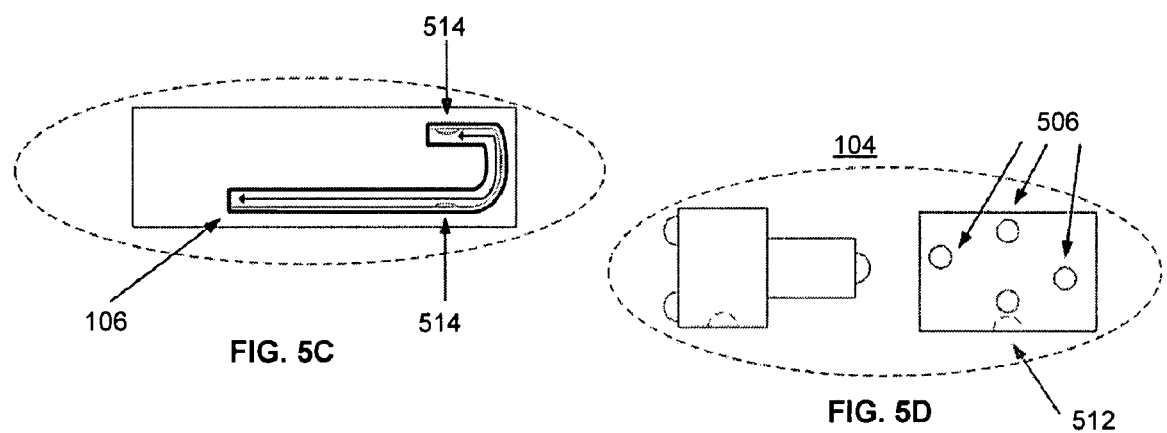
FIG. 5C
FIG. 5D

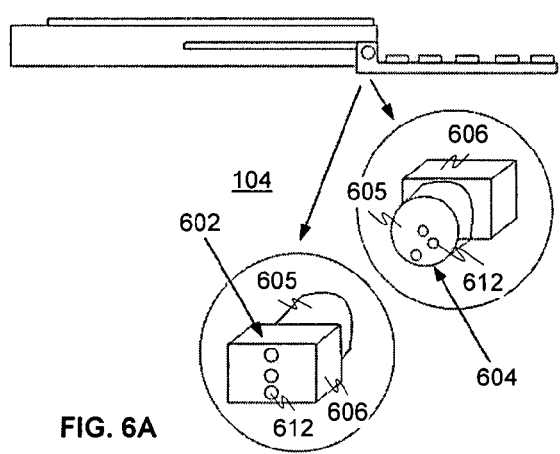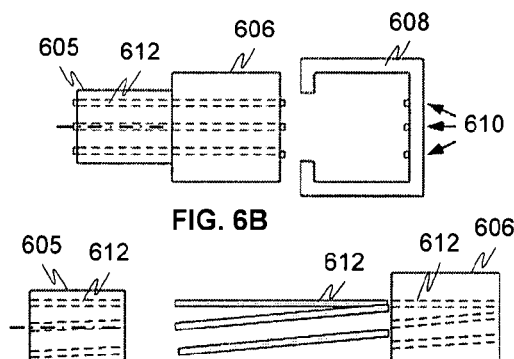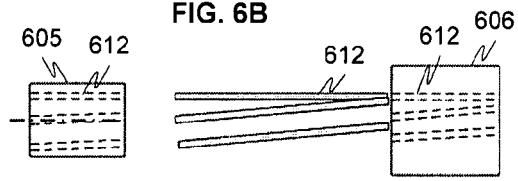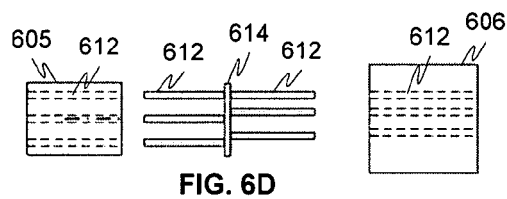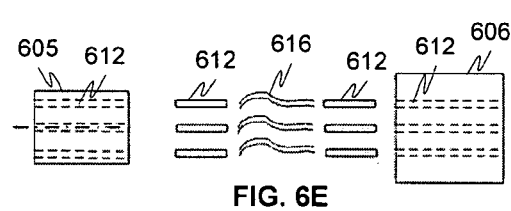
FIG. 6A
FIG. 6B
FIG. 6C
FIG. 6D
FIG. 6E

MULTIFUNCTION ELECTRONIC DEVICE

TECHNICAL FIELD OF THE INVENTION

The invention relates to a sliding and clamshell multifunction electronic device mechanism, and further to a hinge solution in said mechanism. Here the term electronic device means any hand-held apparatus, such as mobile phones and PDAs (Personal Digital Assistant).

BACKGROUND OF THE INVENTION

Electronic devices are attempted to be made as small as possible in order to make them easily transportable in pockets or handbags. This tendency is, however, controversial to the feasibility of the terminal, because the user interface, i.e. mainly the keyboard and the display, must be made so small that on the display screen, there is room for limited information only (or the information must be shown on the screen with unreasonably small characters), and the keys and the spaces between them are unreasonably small for the fingers of an adult user.

As a solution, there are suggested various folding terminals, such as a telescopic mobile phone in a prior art document EP 0 944 219, where the telescopic telephone comprises two parts (upper part and lower part) that are sliding in relation to each other. Electronic devices with clamshell mechanisms are also known from prior art (for example a document EP 1473842), where the clamshell mechanism is implemented by a housing and a flap attached by a hinge at the bottom edge of the housing.

There are, however, some disadvantages in the prior art solutions. The terminal with a clamshell mechanism has to be opened, always when used, by turning a flap around the hinge. In addition the hinge structure in the clamshell mechanism is exposed to a significant load. Moreover a display in a terminal with a sliding mechanism is typically mechanically unprotected. Furthermore the terminals with the aforementioned mechanism cannot be used in a conference call mode without in a separate support member. Still in a clamshell model there is need for two displays if the user wants to use the user interface without opening the electronic device.

SUMMARY OF THE INVENTION

The object of the invention is to provide a multifunction mechanism for an electronic device, which allows the use of the electronic device in both sliding and clamshell modes, and further in a conference call mode. In addition the object of the invention is to provide the electronic device mechanism by a hinge, by which an accidentally opening and closing of the terminal between the sliding and clamshell modes can be avoided. Moreover the object of the invention is to avoid the need of the second display of the electronic device when the terminal is used in the clamshell mode since the same display can be viewed in secondary view mode as scaled or as divided view.

The objects of the invention are fulfilled by a multifunction mechanism, wherein the electronic device comprises a first part comprising a first side, and a second side opposite to the first side, and the electronic device further comprises a movable second part attached to the first part by a hinge, where the hinge is adapted to slide in a longitudinal direction of the first part of the electronic device when the second part is turned with relation to the first part of the electronic device so that the longitudinal axes of the first part and the second part of the electronic device are essentially parallel to each other, and where the second part is adapted to move from the second side of the first part of the electronic device toward the first side of the first part of the electronic device around the hinge by a rotation movement, when the hinge is essentially at the bottom edge of the first part.

The additional objects of the invention are fulfilled by a hinge structure comprising a locking member (piece or hole) and corresponding counterpart member (stopping spring bubble) in a groove, and a spring, where the second part of the electronic device connected by the hinge to the first part of the electronic device is adapted to being locked in at least one certain position, when the locking member and the counterpart member (hole and the corresponding stopping spring bubble for example) are forced to form a locking by a springback factor. The hinge is adapted to slide in the groove and to make a lock when the locking member and counterpart member get together. The lock is opened when external force against the springback factor is applied.

The hinge structure can also be implemented by an optical hinge, which serves as a light guide to convey communication data in optical signals between two circuit boards having opto-electronic devices for transmitting and receiving optical signals. The optical hinge is advantageously comprised of a first optical component having a first cavity for optically coupling the first optical component to a first opto-electronic device, which is capable of providing a light beam, so as to allow the light beam to be transmitted through the first cavity along a first optical path; and a second optical component having a second cavity for optically coupling the second optical component to the second opto-electronic device, wherein the second optical component is capable of rotating relative to the first optical component at a rotation angle along a rotation axis, and wherein the first optical component has a first reflecting surface for directing the light beam transmitted along the first optical path towards the second optical component along a second optical path, and wherein the second optical component has a second reflecting surface to redirect the light beam transmitted along the second optical path towards the second cavity along a third optical path, so as to allow the light beam to reach the second opto-electronic device. The hinge structure can also be implemented galvanically.

In addition the objects of the invention are fulfilled by a controllable display, which display space is adapted to being divided when the electronic device is used in the clamshell mode and the second part is turned at least partly above the display. In an embodiment the division can be realized programmatically, for example by a suitable software program run on the electronic device for controlling the display.

The present invention offers remarkable advantages over the known prior art. The user of the electronic device accordant with the invention can use the electronic device in both sliding or clamshell mode, or even in conference call mode, whenever (s)he wants. Further the need of the second display can be avoided according to the present invention. Moreover the mechanism can be manufactured more inexpensively, effectively and easily than the terminals according to the prior art, and moreover the electronic device will be small.

An advantageous mode of the invention is considered to be the multifunction user interface mechanism disclosed in claim 1.

BRIEF DESCRIPTION OF THE DRAWINGS

Next the invention will be described in greater detail with reference to exemplary embodiments in accordance with the accompanying drawings, in which:

FIGS. 1a-f illustrate side-views of an exemplary electronic device with a multifunction mechanism in different modes according to an advantageous embodiment of the invention, FIGS. 2a-d illustrate front-views of an exemplary electronic device with a multifunction mechanism in different modes according to an advantageous embodiment of the invention, FIGS. 3a-d illustrate front-views of a second exemplary electronic device with a multifunction mechanism in different modes according to an advantageous embodiment of the invention, FIGS. 4a-f illustrate exemplary support mechanisms of a multifunction mechanism according to an advantageous embodiment of the invention, FIGS. 5a-b illustrate a structure of an exemplary hinge of an electronic device with a multifunction mechanism according to an advantageous embodiment of the invention, FIGS. 5c-d illustrate a structure of a second exemplary hinge-groove couple in an electronic device with a multifunction mechanism according to an advantageous embodiment of the invention, and FIGS. 6a-e illustrate an exemplary hinge structure of a multifunction mechanism according to an advantageous embodiment of the invention.

DETAILED DESCRIPTION

FIGS. 1a-f illustrate side-views of an exemplary electronic device 100 with a multifunction mechanism in different modes according to an advantageous embodiment of the invention, where in FIG. 1b the electronic device 100 is in a clamshell mode, in other words a second part 102 (flap) of the electronic device 100 is turned around a hinge 104 above a first side 108 of the first part 101 (or above a display 109, if the display 109 locates on the first side 108 of the first part 101 of the electronic device 100). The hinge 104 is at the bottom edge of the first part 101 in the basic clamshell mode (FIG. 1b, for example).

Now it should be noted that the first part 101 of the electronic device 100 comprises a sliding groove 106 essentially parallel to the longitudinal axis 101a of the first part 101, whereupon the hinge 104, through which the movable second part 102 is attached to the first part 101, is adapted to slide along the sliding groove in a longitudinal direction (in direction of the longitudinal axis 101a) of the first part 101, when the second part 102 is turned so, that its longitudinal axis is essentially parallel to the longitudinal axis of the first part 101, as illustrated in FIGS. 1a, 1b, 1d and 1e. Thus the second part 102 (flap) can be moved to the upper edge from the opposing bottom edge of the first part 101, as illustrated in FIG. 1a (clamshell mode), when the second part 102 is turned above the first side 108 of the first part 101 of the electronic device 100.

The second part 102 can be turned around the hinge 104 to different positions, such as to an advantageous calling position, where the user holds the electronic device in his/her hand and the opening of the second part 102 is limited to a certain angle (15 degrees for example, but this is only an exemplary limitation and can be varied), as illustrated in FIG. 1c. The limitation can be achieved by a hinge structure discussed later in this document.

An advantageous feature of the present electronic device 100 is that the second part 102 can be further turned around the hinge 104 toward a second side 107 of the electronic device 100 until the longitudinal axis 102a of the second part 102 is essentially parallel to the longitudinal axis 101a of the first part 101 of the electronic device, as shown in FIG. 1d, whereupon the second part 102 can be slid or moved behind to the second side 107 of the first part 101 of the electronic device 100, as illustrated in FIG. 1e (sliding mode).

An additional advantageous feature of the present electronic device 100 is that the second part 102 can further be turned around the hinge 104 to the second side 107 of the first part 101 of the electronic device 100 so that the angle α between the backside 102b of the second part 102 and the second side 107 of the first part 101 of the electronic device 100 is equal to or less than 90 degrees as shown in FIG. 1f. In this mode the second part 102 operates as a support member for the electronic device 100 or the first part 101 of the electronic device 100 and the electronic device 100 can be advantageously used in conference call mode, for example.

According to an exemplary arrangement the first part 101 of the electronic device 100 comprises a display 109, which is most advantageously located on the first side 108 of the first part 101. In addition the second part 102 advantageously comprises a keyboard 103, most advantageously opposite to backside 102b of the second part 102. Further the second part 102 may comprise an additional memory card. The display may be a touchpad display, for example.

According to an embodiment of the present invention the pair of sliding groove 106 and hinge 104 are implemented by a slide rail in the first part 101 of the electronic device 100 and a counterpart member in the second part 102 of the electronic device 100 compatible with the slide rail, where the counterpart member (acting as a hinge) is adapted to slide in the groove 106. This is illustrated in more detail in FIGS. 5 and 6.

In addition FIG. 1e shows possible places for system connectors 110 in electronic device 100 with a multifunction mechanism according to the present invention.

FIGS. 2a-d illustrate front-views of an exemplary electronic device 100 with a multifunction mechanism in different modes according to an advantageous embodiment of the invention, where in FIG. 2a (corresponding FIGS. 1c and 1d) the second part 102 of the electronic device 100 is turned around the hinge 104 to the open position, if the second part 102 was in clamshell position at the beginning, or slid along the sliding groove (denoted by 106 in FIGS. 1a-f), if the second part 102 was in sliding position (behind the first part 101 of the electronic device 100) at the beginning.

In FIG. 2b the electronic device is in turn in the sliding position and closed, whereupon the second part 102 locates behind the first part 101 of the electronic device 100 (in other words the second part 102 and the first part 101 locate in an essentially overlapping fashion). In closed sliding position the second part 102 of the electronic device 100 is at first turned around the hinge 104 so that the longitudinal axis of the first part 101 and the second part 102 of the electronic device 100 are essentially parallel to each other, and then slid behind the first part 101 of the electronic device 100. Now it should be noted that the hinge 104 has been slid in the sliding groove (denoted by 106 in FIGS. 1a-f) and is in different location as in FIGS. 2a and 2c.

Alternatively the electronic device is in a conference call mode in FIG. 2b, whereupon the second part 102 of the electronic device 100 is turned around the hinge 104 to the second side 107 of the electronic device 100 so that the angle α between the backside 102b of the second part 102 and the second side 107 of the first part 101 of the electronic device 100 is equal to or less than 90 degrees as illustrated in FIG. 1f.

In FIG. 2c the electronic device is in the clamshell mode (corresponding FIG. 1b), in other words the second part 102 of the electronic device 100 is turned around the hinge 104 above the first side 108 of the first part 101. Now it should be noted that the hinge 104 is essentially at the same location (at the bottom edge of the first part 101) as in FIG. 2a.

In FIG. 2d the electronic device is in the clamshell mode (corresponding FIG. 1a), in other words the second part 102 of the electronic device 100 is turned around the hinge 104 above the first side 108 of the first part 101 and slid or moved to the upper edge from the opposing bottom edge of the first part 101, as illustrated in FIG. 2c. Now it should be noted that the hinge 104 is essentially at the same location (essentially at the middle of the first part 101) as in FIG. 2b.

According to an advantageous embodiment of the invention a display 109 of the electronic device is a controllable display, which display space can be divided or scaled when the electronic device 100 is used in the clamshell mode, as shown in FIGS. 2c and 2d. This means that in the open mode (as shown in FIGS. 2a and 2b) the user can use the whole display area but in the clamshell mode the display space is divided or scaled smaller so that the effective display space is essentially the area being in view (as shown in FIGS. 2c and 2d).

FIGS. 3a-d illustrate front-views of a second exemplary electronic device 100 with a multifunction mechanism in different modes according to an advantageous embodiment of the invention, where the electronic device 100 also comprises operating buttons 302 in the first side 108 of the first part 101. In the embodiment the second part 102 of the electronic device 100 comprises an opening adapted so that when the second part 102 is turned around the hinge above the first side 108 of the first part 101, the operating buttons 302 in the first side 108 of the first part 101 are still available. Otherwise the embodiment illustrated in FIGS. 3a-d corresponds to the embodiment illustrated in FIGS. 2a-d.

FIGS. 4a-f illustrate exemplary support mechanisms of a multifunction mechanism according to an advantageous embodiment of the invention. In FIG. 4a a separate support member 402 is used to support the electronic device 100 for example in a video teleconference or in a conference call mode. The support member 402 is advantageously attached with a hinge 403 to the second side 107 (backside) of the first part 101 of the electronic device 100. FIG. 4b illustrates the support member 402 on an opened position. In FIG. 4c the electronic device 100 is still supported by the support member 402 and the second part 102 of the electronic device 100 is in the opened position, whereupon the user can use the keyboard of the second part 102 of the electronic device 100.

FIG. 4d illustrates a separate sliding support piece 404, which is attachable at least to the second part 102 of the electronic device 100 as an additional support member, as shown in FIGS. 4e and 4f. The separate sliding support piece 404 is attached to the second part 102 of the electronic device 100 and is in closed position in FIG. 4e. In FIG. 4f the second part 102 of the electronic device 100 is turned around the hinge 104 to a certain position, advantageously to a position where the hinge structure locks the second part 102 to a certain angle in relation to the first part 101 of the electronic device 100, and the separate sliding support piece 404 is slid out in order to support the electronic device 100 in this position.

The separate sliding support piece 404 can be moved in the longitudinal direction of the second part 102 of the electronic device, as illustrated by an arrow 406 in FIG. 4f.

FIGS. 5a-b illustrate a structure of an exemplary hinge-groove (104, 106) couple in an electronic device with a multifunction mechanism according to an advantageous embodiment of the invention, where in FIG. 5a the detailed structure of the groove 106 is shown. FIG. 5b illustrates the structure of the hinge 104, where the hinge 104 comprises locking member 502 adapted to slide in the groove 106. The operation of the hinge-groove structure is based on a springback factor resisting the motion of the second part of the electronic device to the position, where the second part can turn around the hinge. The springback factor is applied only in the direction of arrow 503, and there is no springback factor in direction of arrow 504. The locking member is adapted to lock the second part of the electronic device to positions 505 in FIG. 5a.

According to an advantageous embodiment the hinge structure also comprises connector pads 506 used to form an electric connection in between the first part and the second part of the electronic device.

FIGS. 5c-d illustrate a structure of a second exemplary hinge-groove (104, 106) couple in an electronic device with a multifunction mechanism according to an advantageous embodiment of the invention, where in FIG. 5c the detailed structure of the groove 106 is shown. FIG. 5d illustrates the structure of the hinge 104, where the hinge 104 comprises locking member 512, which is advantageously implemented by an opening or a hole. In addition the groove 106 comprises in this embodiment stopping spring bubbles 514 in appropriate positions, whereupon when the hinge 104 is slid in the groove 106 the locking member 512 (opening or hole) of the hinge 104 will form a lock with the stopping spring bubble 514. The lock can be opened by applying an external force against springback factor induced by the stopping spring bubble 514.

According to an advantageous embodiment the hinge structure also comprises connector pads 506 used to form an electric connection in between the first part and the second part of the electronic device. The connections can be implemented galvanically, but alternatively also by an optical hinge mechanism illustrated above in connection with the summary of the invention section.

FIGS. 6a-e illustrate an exemplary hinge structure 104 comprising a first part 605 and a second part 606, and further a slot element 608 forming the groove 106 of the electronic device according to an advantageous embodiment of the invention. FIG. 6A illustrates a backside view 602 of the second part 606 of the hinge with 3 connector pins 612 and frontside view 604 of the first part 605 of the hinge with 3 connector pins 612, where the pins are twisted, when the hinge is rotated.

FIG. 6B illustrates an exploded view of the hinge-groove structure, where the hinge comprises the first part 605 and the second part 606 with 3 connector pins 612 (illustrated by dashed lines). The slot element 608 forms the groove, where the hinge 106 (more detailed the second part 606 of the hinge 106) is adapted to slide. The slot element 608 also comprises sliding surface or counterpart members 610 to make a connection between the electronics of the electronic device and the connector pins 612. Now it should be noted that the pins 612 are not twisted in the second part 606 although the hinge is rotated and thus the connection between the pins 612 and the counterpart members 610 in the slot element 608 can remain.

FIG. 6C illustrates an exploded view of an exemplary hinge structure, and how the pins 612 can be twisted, when the hinge is rotated.

FIG. 6D illustrates an exploded view of an exemplary hinge structure with the first part 605 and the second part 606, where the first part of the pins 612 is arranged into the first part 605 of the hinge and the second part of the pins 612 is arranged into the second part 606 of the hinge and the first and second parts of the pins 612 are connected to each other over a circuit board 614. In addition FIG. 6E illustrates an exploded view of an exemplary hinge structure with the first part 605 and the second part 606, where the first part of the pins 612 is arranged into the first part 605 of the hinge and the second part of the pins 612 is arranged into the second part 606 of the hinge and the first and second parts of the pins 612 are connected to each other over a flexible cable 616.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. Especially it should be noticed that the invention can be implemented in all kinds of electronic devices, such as in mobile phones and PDA devices.

The invention claimed is:

1. An electronic device comprising:
    a first part having a first side, and a second side opposite to the first side,
    a movable second part attached to the first part by a hinge, the hinge configured to slide in an essentially longitudinal direction of the first part of the electronic device when the second part is turned with relation to the first part of the electronic device so that the longitudinal axis of the first part and the second part of the electronic device are essentially parallel to each other, and
    the second part configured to move from the second side of the first part of the electronic device toward the first side of the first part of the electronic device around the hinge by a rotation movement,
    wherein the hinge further comprises a first part with a connector element and a second part with a counterpart connector element, and the connector element in the first part configured to be twisted and the connector element in the second part configured to be not twisted, when said parts are turned relative to each other.

2. The electronic device according to claim 1, wherein the second part of the electronic device is further configured to turn around the hinge toward the second side of the electronic device so that the angle between the backside of the second part of the electronic device and the second side of the first part of the electronic device is equal to or less than 90 degrees, whereas the second part of the electronic device operates as a support member for the electronic device or the first part of the electronic device.

3. The electronic device according to claim 1, wherein the rotation movement around the hinge is configured to happen when the hinge is essentially at a bottom edge of the first part.

4. The electronic device according to claim 1, wherein the first part of the electronic device comprises a display.

5. The electronic device according to claim 4, wherein the display is a touchpad display.

6. The electronic device according to claim 1, wherein the second part of the electronic device comprises a keyboard.

7. The electronic device according to claim 1, the electronic device comprising a display having a display space, where the display space is configured to being divided or scaled when the electronic device is used in a clamshell mode.

8. The electronic device according to claim 1, wherein the hinge comprises at least one connector in order to form an electric connection in between the first part of the electronic device and the second part of the electronic device.

9. The electronic device according to claim 1, wherein the first part of the electronic device further comprises a groove essentially parallel to the longitudinal axis of the first part of the electronic device, and the hinge is compatible with the groove so that the hinge, through which the second part of the electronic device is attached to the first part of the electronic device, is configured to slide along the groove in an essentially longitudinal direction of the first part of the electronic device when the second part of the electronic device is turned with relation to the first part of the electronic device so that the longitudinal axis of the first part of the electronic device and the second part of the electronic device are essentially parallel to each other.

10. The electronic device according to claim 9, wherein the groove is implemented by a slide rail in the first part of the electronic device and the hinge is implemented by two parts so that the second part of the hinge is configured to slide in the groove.

11. An electronic device comprising:
    a first part, the first part having a first side, and a second side opposite to the first side,
    a movable second part attached to the first part by a hinge, the hinge is configured to slide in an essentially longitudinal direction of the first part of the electronic device when the second part is turned with relation to the first part of the electronic device so that the longitudinal axis of the first part and the second part of the electronic device are essentially parallel to each other, and
    the second part configured to move from the second side of the first part of the electronic device toward the first side of the first part of the electronic device around the hinge by a rotation movement,
    wherein the hinge further comprises a first part with a connector element and a second part with a counterpart connector element, and the connector element in the first part configured to be twisted and the connector element in the second part configured to be not twisted, when said parts are turned relative to each other.

12. The electronic device according to claim 11, wherein the second part of the electronic device is further configured to turn around the hinge toward the second side of the electronic device so that the angle between the backside of the second part of the electronic device and the second side of the first part of the electronic device is equal to or less than 90 degrees, whereas the second part of the electronic device operates as a support member for the electronic device or the first part of the electronic device.

* * * * *